Figure 1:
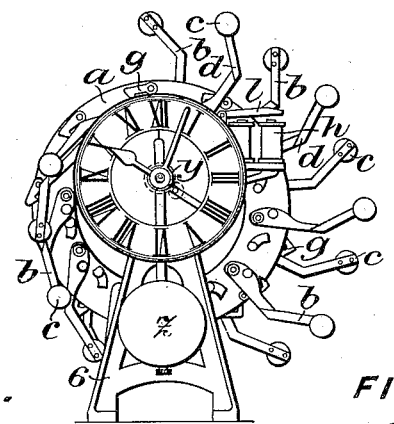

H. CREESE.
ELECTRIC CLOCK AND LIKE INSTRUMENT.
APPLICATION FILED DEC. 10, 1909.

990,342.

Patented Apr. 25, 1911.

2 SHEETS—SHEET 1.

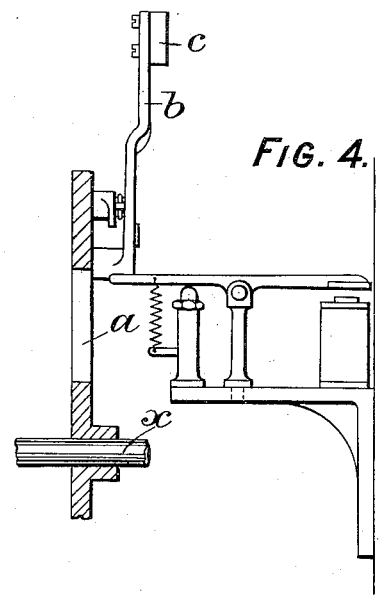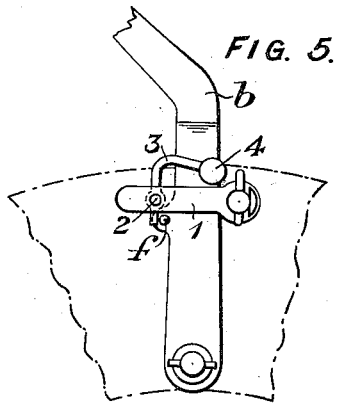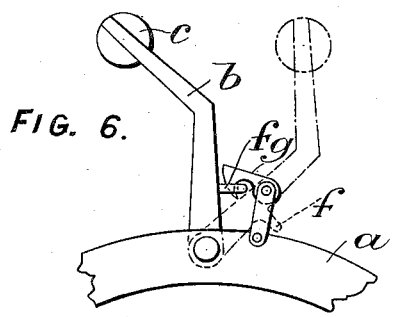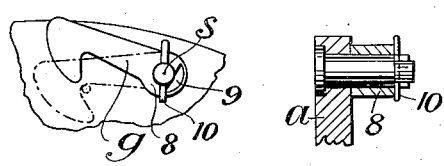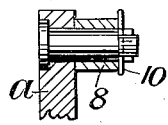

For the following is a specification.

UNITED STATES PATENT OFFICE.

HENRY CREESE, OF LONDON, ENGLAND.

ELECTRIC CLOCK AND LIKE INSTRUMENT.

990,342.  Specification of Letters Patent.  Patented Apr. 25, 1911.

Application filed December 10, 1909. Serial No. 532,372.

*To all whom it may concern:*

Be it known that I, HENRY CREESE, a subject of the King of Great Britain, residing at 9a Reeves Mews, South Audley street, in the city of London, England, have invented new and useful Improvements Relating to Electric Clocks and Like Instruments, of which the following is a specification.

This invention comprises improvements relating to electric clocks and like instruments such as for instance clock like motors required to drive scientific apparatus a given number of revolutions per unit of time.

This invention has for its object to provide an apparatus of this description which shall have a simple action, occupy but little space, and consume only a small amount of electric current and nevertheless work accurately and reliably for long periods without requiring attention.

According to this invention the motor element of the clock or like apparatus comprises a revoluble body carrying a number of weighted arms which are capable of being successively projected from the body at a certain point in the revolution. While certain of the arms are thus projected to one side of the axis of revolution, other arms, at the opposite side, are permitted to approach the center of revolution, so that the weight on one side of the body, acting at a greater leverage than that on the other side, exerts a driving effort upon the said body which latter is suitably geared to a train of wheels provided with some form of escapement or regulator. It is convenient to employ an electromagnet for the projection of the weights and preferably the armature of the magnet constitutes one arm of a double armed lever, the other arm of which lies in the path of the weighted arms and the circuit being intermittently established at the proper moments, the lever is oscillated and successively projects the arms, locking means being provided for retaining the arms in the projected position for as long as is necessary.

Figure 2:
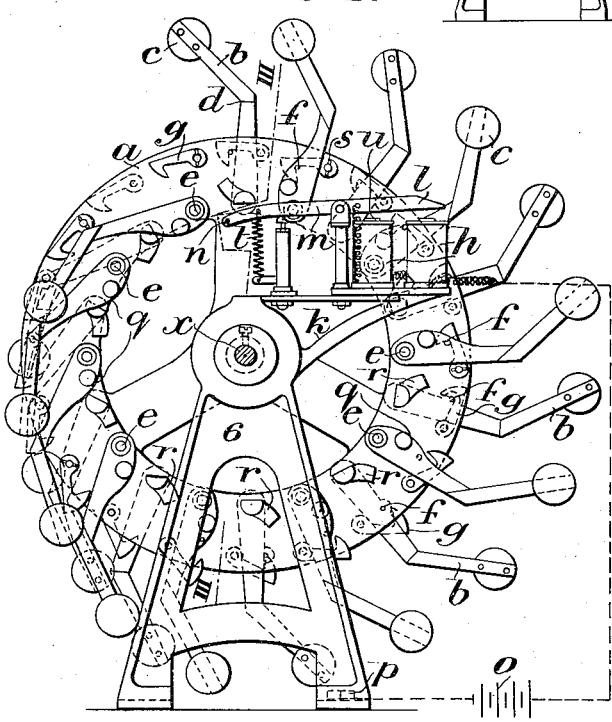
Figure 3:
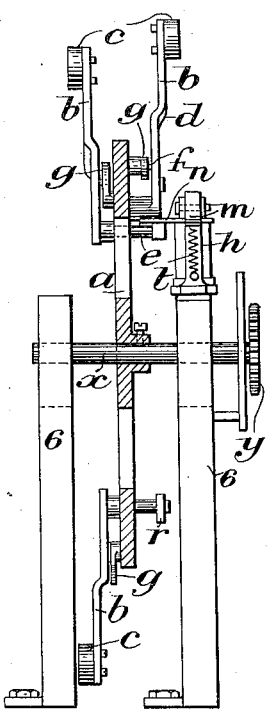

In the accompanying drawings:—Figure 1 is a front elevation of one construction of electric clock in accordance with this invention. Fig. 2 is a front elevation on a larger scale than Fig. 1 with the dial of the clock removed. Fig. 3 is a sectional side elevation on the line III—III Fig. 2. Fig. 4 is a side elevation of a modified form of arrangement for projecting the arms, and Fig. 5 is a modified form of pawl for holding the arms in the projected position. Fig. 6 is a detail view of a modification. Fig. 7 is an elevation of a pawl of the kind shown in Fig. 2 to a larger scale and Fig. 8 is a section of same.

According to Figs. 1 to 3 the revoluble body takes the form of a disk or wheel *a* supported in a framing 6 and around the periphery of which a number of arms *b* are pivoted on pivots *e*, each arm carrying a weight or bob *c* at its outer extremity. Two sets of arms are shown, one set being pivoted to one side of the disk or wheel *a* and the other set to the opposite side, in order that the weight of the arms and bobs may be better distributed. The arms *b* may be bent as at *d* or even knee jointed or they may be straight. Each arm *b*, moreover carries, not far from its pivot *e*, a projection *f*. A corresponding number of detents or pawls *g* are pivoted near the periphery of the disk or wheel *a* so as to alternate with the arms *b* and in such positions that they will engage the projections *f* and retain the arms *b* when the weighted ends of the latter are thrown outwardly, so that the inner portions of the arms *b* stand, for instance, radially with regard to the disk or wheel *a*. An electromagnet *h* is mounted, suitably upon brackets *k* on the framing or support 6, at one side of the disk or wheel *a* and there may be a second magnet similarly supported upon the opposite side of the disk or wheel *a*. The armature of each electro-magnet preferably constitutes one arm *l* of a double armed lever, the other arm *m* of which, or a projection *n* upon such other arm *m*, lies in the path of the weighted arms *b*.

The establishment of the circuit is secured by earthing one pole of the battery *o* on the framing 6, for instance at *p*, and connecting one terminal of the winding of each electro-magnet to the respective armature *l* which is suitably insulated from the framing 6, the other terminal of the winding being connected direct to the other pole of the battery *o*. With this arrangement the moment a weighted arm comes into contact with the obstructive arm *m* of the double armed lever or the projection *n* thereon, the circuit is completed and the armature *l*, being attracted, rocks the double armed lever *l m*. The arm *m*, or the projection *n*, now engages with a cam surface *q* on the weighted arm *b*, or with a cam *r* fixed to the pivot of the arm *b* if the latter is on the opposite side of the wheel *a*. Thus the particular weighted arm *b* making the contact is thrown outward so that the weight of this arm *b* will be projected from the periphery of the disk or wheel *a* and thereafter participate in the driving action, being at first retained in the projected position by the corresponding detent *g* as stated above. Subsequently the arm *b* rests on a stop or pin *s* which may be the projecting pivot of the pawl *g* or a separate projection on the wheel *a*. If desired the stops *s* may be covered with rubber to prevent shock when the arms *b* strike the stops *s*. Immediately the weighted arm *b* has been thrown, the circuit is broken, and a spring *t* pulls off the armature *l*. A non-magnetic pin or disk *u* is fitted to the poles of the magnet so that when the circuit is made the armature rests on the pin or disk *u* and does not contact with the poles. Thus the non-magnetic material, upon interruption of the circuit, prevents the armature from sticking to the magnet. With this arrangement it may not be necessary to employ a spring *t* as the armature *l* may be allowed to fall under the action of gravity. The detents or pawls *g* drop out of engagement soon after they pass the horizontal diameter of the disk or wheel *a*. If the projections *f* be laterally bent so as to extend over the periphery of the wheel *a* as shown in Fig. 6, when the pawls drop out of engagement such projections *f* will abut upon the periphery of the disk or wheel *a* and maintain the weighted arms still in the projected position. As shown in Fig. 2 an arm *b* after the pawl has dropped out of engagement falls against the pivot pin *s* of that pawl. When an arm *b* passes the lower end of the vertical diameter of the wheel *a*, and commences to rise upon the opposite side of the axis of revolution, the action of the weight *c* tends to fold the respective arm *b* and to move closer to the periphery of the disk or wheel *a*. Suitable stops are preferably provided to limit the movement of the arms and weights inward toward the axis of the wheel *a* because, of course, after rising past the lower end of the vertical diameter a pivoted weighted arm would tend to hang vertically downward. If the weights are maintained, however, about level with the periphery of the wheel or disk *a*, the arms *b* are in a better position for being thrown outward upon arrival opposite the armature *l*. As shown in Fig. 2, a convenient arrangement is that according to which the bob *c* on each arm rests upon the next arm beneath, during that period of the revolution in which such arm is rising to the point where it will be operated upon by the armature.

The number and length of the arms *b* is chosen with relation to the diameter of the disk or wheel *a* so that there shall be non over-crowding, or mutual interference in working, of the parts.

The spindle *x* of the disk or wheel *a* may run in ball bearings and may carry a pinion *y* gearing with the first member of a clock train suitably supported upon the framing and having any form of escapement or regulator, for instance in Fig. 1 a pendulum *z* is shown, and some of the wheels of a clock train which is of any suitable and known description.

In Fig. 4 a modified arrangement of armature is shown for projecting the arms *b*, the double armed lever being arranged in a plane at right angles to the plane of the disk or wheel *a* whereas in the previous construction the double armed lever is arranged in a plane parallel or approximately parallel to the plane of the disk or wheel *a*. The action of this construction is similar to that of the construction seen in Figs. 1 to 3, excepting that the tip of the arm itself projects the arms *b*.

Fig. 5 illustrates a modified form of pawl for retaining the arms *b* in the projected position. In this case the pawl comprises a lever *l* on which is pivoted at 2 a bent lever 3 fitted at one end with a weight or bob 4. The other end 5 is adapted to engage the projections *f* on the corresponding arm *b* and to hold the latter in the projected position. As the wheel *a* gradually revolves, the weight 4 gradually moves the end 5 of the bent lever 3 out of engagement with the projection *f*. As shown in Figs. 7 and 8, the hub 8 of the pawl is formed with a segmental end projection 9 which limits the swing of the pawl in either direction by one end of the segment or the other coming against the pin 10 inserted through the pivot pins.

Among the advantages possessed by this invention is its capability of ready adaptation to existing clocks.

What I claim as my invention, and desire to secure by Letters Patent is:—

1. A motor for clocks and the like comprising in combination, a revoluble body, a circular series of movable independent weights thereon, an electro-magnetic device operative upon said weights in succession to move them away from the axis of revolution toward one side of said axis, said weights having an automatic return movement toward said axis on the other side thereof independently of the projection of said weight, and means adapted to energize intermittently said electro-magnetic device.

2. A motor for clocks and the like comprising in combination a revoluble body, a circular series of movable independent weights thereon, an electromagnetic device adapted to be momentarily energized upon the approach of each weight in succession and to project the approaching weight away from the axis of revolution toward one side of said axis, said weights having an automatic return movement toward said axis on the other side thereof independently of the position of said weight, and stops to limit the movement of said weights.

3. A motor for clocks and the like comprising a rotatable body, a circular series of independently movable arms pivotally mounted thereon, an electro-magnetic device successively operable on said arms to project them to one side of the axis of revolution, said arms being returned gradually by gravity toward said axis on the other side thereof independently of the projection of said arms and means adapted to energize intermittently said electro-magnetic device.

4. A motor for clocks and the like comprising in combination a revoluble body, a circular series of weighted arms pivotally mounted upon said body, an electro-magnet, an armature for said magnet normally in the path of approaching pivoted arms and operative to project successively the weighted ends of said arms away from and toward one side of the axis of said revoluble body, and means under control of said body adapted to momentarily complete the circuit of said electromagnet whenever one of said arms is in operative relation with said armature.

5. A motor for clocks and the like comprising in combination a revoluble body, a circular series of weighted arms pivotally mounted upon said body, an electromagnet, an armature for said magnet normally in the path of approaching pivoted arms and operative to project the weighted ends of said arms away from and toward one side of the axis of said revoluble body, means under control of said body adapted to momentarily complete the circuit of said electromagnet whenever one of said arms is in operative relation with said armature, and catches automatically operative to retain respective weighted arms in the projected position and to fall out of engagement with said arms at a certain point in the revolution of said body.

6. A motor for clocks and the like comprising in combination a revoluble body, a circular series of weighted arms pivotally mounted upon said body, an electro-magnet, a striker under the influence of said magnet and adapted to strike the nearest one of the series of arms when said magnet is energized in order to project said arm away from and toward one side of the axis of said body, and means under control of said body adapted to complete the circuit of said magnet whenever one of said arms closely approaches said striker.

7. A motor for clocks and the like comprising in combination a revoluble body, a circular series of weighted arms pivotally mounted upon said body, an electro-magnet, a striker under the influence of said magnet and adapted to strike the nearest one of the series of arms when said magnet is energized in order to project said arm away from and toward one side of the axis of said body, gravity pawls upon said body each adapted to retain a respective arm in the projected position until a certain point in the revolution of said body is reached, and means under control of said body adapted to complete the circuit of said magnet whenever one of said arms closely approaches said striker.

8. A motor for clocks and the like comprising in combination a revoluble body, a circular series of weighted arms pivotally mounted upon said body, stops for limiting the pivotal movement of said arms an electromagnet, and a striker under the influence of said magnet said striker being electrically connected so as to constitute one terminal of the circuit of the winding of said magnet and positioned so as to contact with each of said arms successively said arms constituting opposite terminals of said circuit, whereby whenever an arm during the revolution of the body moves into contact with said striker the latter is operated by said magnet and strikes the said arm into a projected position in which it exerts a turning effort on said body during a portion of a revolution.

9. A motor for clocks and the like comprising in combination a revoluble body, a circular series of weighted arms pivotally mounted upon said body, stops for each arm to limit the pivotal movement thereof, an electromagnet, a striker under the influence of said magnet and adapted to strike the weighted arms successively into a projected position to one side of the axis of revolution the circuit of said magnet being completed by said arms successively contacting with said striker, and a circular series of gravity pawls adapted to secure respective arms in the projected position.

10. A motor for clocks and the like comprising in combination a revoluble body, a circular series of weighted arms pivotally mounted upon said body, stops for each arm to limit the pivotal movement thereof, an electromagnet, a striker under the influence of said magnet and adapted to strike the weighted arms successively, into a projected position to one side of the axis of revolution the circuit of said magnet being completed by said arms successively contacting with said striker a circular series of gravity pawls pivoted on said body adapted to secure respective arms in the projected position, and a pair of stops for each pawl to limit the pivotal movement thereof.

11. A motor for clocks and the like comprising in combination a revoluble body, a circular series of weighted arms pivotally mounted upon said body, a stop for each arm for limiting the outward movement thereof, an electromagnet and a two-armed lever one arm of which constitutes an armature of said magnet while the opposite arm projects into the path of the approaching weighted arms near to the point in the revolution at which said weighted arms commence their descent, said weighted arms and said opposite arm being operative as circuit makers and breakers in the circuit of the winding of said magnet, the intermittent energizing of said magnet causing said lever to act as a striker to successively project said weighted arms substantially as set forth.

12. A motor for clocks and the like comprising in combination a revoluble body, a circular series of weighted arms pivotally mounted upon said body, a stop for each arm for limiting the outward movement thereof, an electromagnet, projections on said arms each projection being adapted to lie in the path of pivotal movement of the arm in advance whereby on one side of the axis of revolution each arm limits the inward pivotal movement of the next arm in advance, and a two-armed lever one arm of which constitutes an armature of said magnet while the opposite arm projects into the path of the approaching weighted arms near to the point in the revolution at which said weighted arms commence their descent, said weighted arms and said opposite arm being operative as circuit makers and breakers in the circuit of the winding of said magnet, the intermittent energizing of said magnet causing said lever to act as a striker to successively project said weighted arms substantially as set forth.

In testimony whereof I have signed my name to this specification in the presence of two subscribing witnesses.

HENRY CREESE.

Witnesses:
LOUIS CARREZ,
F. L. RANDS.